Patented Oct. 23, 1923.

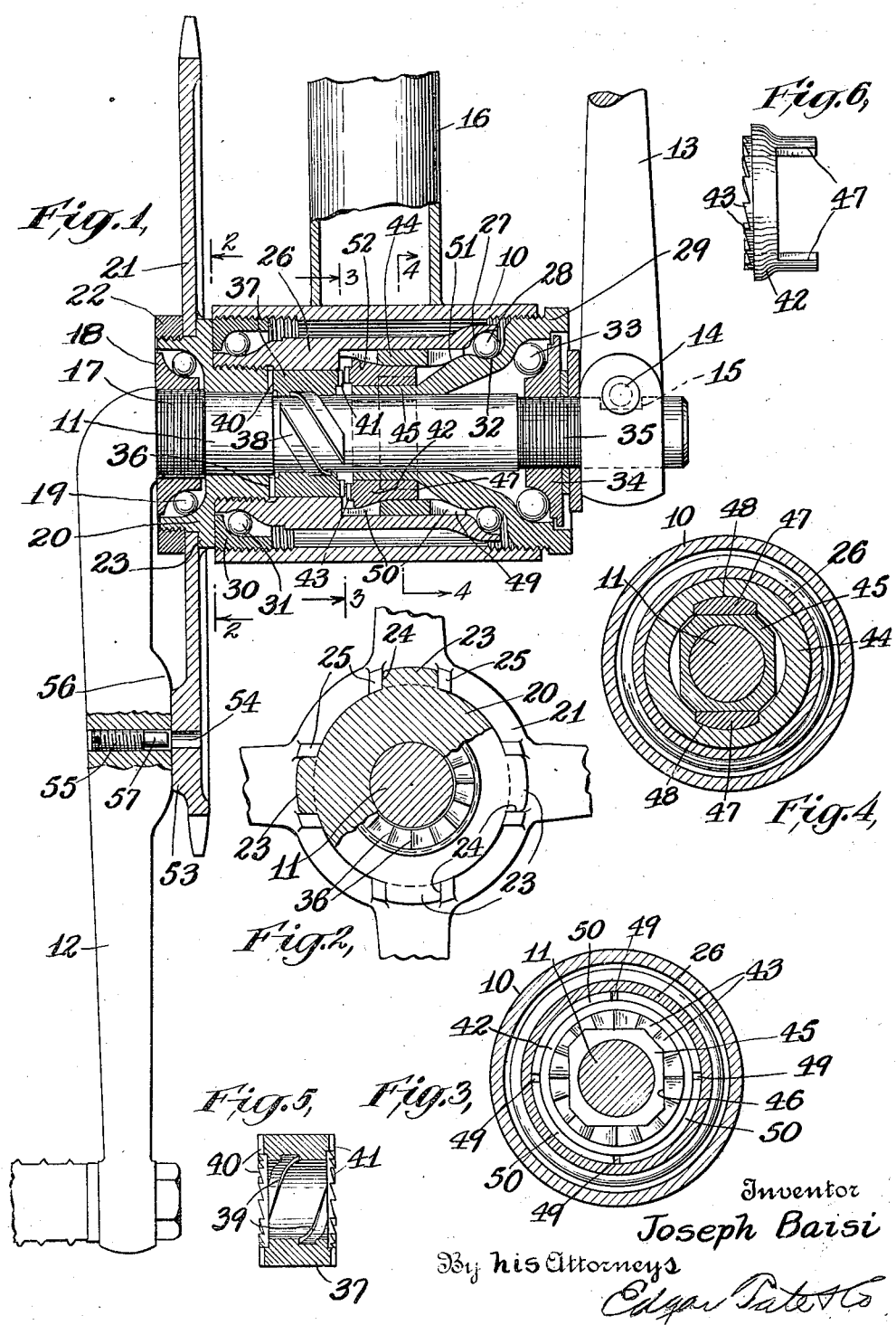

1,471,538

UNITED STATES PATENT OFFICE.

JOSEPH BAISI, OF NEW YORK, N. Y., ASSIGNOR OF ONE-HALF TO AMBROGIO MELLI, OF NEW YORK, N. Y.

DRIVE AND COASTER-BRAKE CONSTRUCTION.

Application filed June 28, 1922. Serial No. 571,373.

*To all whom it may concern:*

Be it known that I, JOSEPH BAISI, a citizen of Italy, and residing at New York, in the county of New York and State of New York, have invented certain new and useful Improvements in Drive and Coaster-Brake Constructions, of which the following is a specification, such as will enable those skilled in the art to which it appertains to make and use the same.

This invention relates to a drive and coaster brake construction and particularly to devices of this class designed for use in connection with bicycles and similar apparatus, and the object of the invention is to provide a device of the class specified which is mounted in connection with and adapted to cooperate with the drive shaft of the vehicle, or the pedal shaft thereof as well as in connection with the drive sprocket of the vehicle to control the movement of said sprocket and to brake the action of the vehicle at will; a further object being to provide a strong and durable bearing for the rotatable member of the brake device; a further object being to provide a floating clutch member for controlling the driving and braking of the rotatable member, said clutch member being operated by the drive or pedal shaft; a still further object being to provide means for coupling the pedal shaft or one of the pedals thereof with the drive sprocket; and with these and other objects in view the invention consists in a device of the class and for the purpose specified which is simple in construction, efficient in use and which is constructed as hereinafter described and claimed.

The invention is fully disclosed in the following specification, of which the accompanying drawing forms a part in which the separate parts of my improvement are designated by suitable reference characters in each of the views, and in which:—

Fig. 1 is a sectional detail view of my improved drive and coaster brake mechanism showing the same mounted in connection with a part of the framework of a vehicle;

Fig. 2 a partial section on the line 2—2 of Fig. 1;

Fig. 3 a section on the line 3—3 of Fig. 1;

Fig. 4 a section on the line 4—4 of Fig. 1; and,

Fig. 5 a sectional detail view of part of a clutch mechanism which I employ; and, Fig. 6 a detail view of a part of the construction which I employ.

In the drawing, I have shown at 10 the central hub portion of the frame of a bicycle through which the crank or pedal shaft 11 passes, said shaft being provided with an integral pedal arm 12 and a detachable pedal arm 13 held in position by a pin or bolt 14 cooperating with a cut-out portion 15 in the shaft as shown in Fig. 1. In Fig. 1 of the drawing I have shown at 16 one of the tubular stanchions of the framework of a bicycle, and it will be understood that the other members of the framework will be connected therewith in the usual manner.

The end portion of the shaft 11 adjacent to the pedal 12 is threaded as shown at 17 to receive a ball race or collar 18 forming part of a ball bearing construction 19 which cooperates with a sleeve 20 in connection with which a sprocket wheel 21 is mounted and held in position by a retaining nut 22 and by lugs 23 on the sleeve 20 operating in correspondingly formed recesses 24 on the inner face of the sprocket 21, said recesses being formed by pairs of projecting lugs 25 as clearly shown in Fig. 2 of the drawing. The sleeve 20 is mounted upon the shaft 11 and detachably connected therewith is a member 26 in the form of a sleeve one end of which is threaded upon the sleeve to form an integral part thereof, and the other end is cup-shaped in form as shown at 27 to receive a number of ball bearings 28 which also operate in connection with a sleeve member 29.

Another ball race or sleeve 30 is threaded into one end of the tubular hub 10 and forms part of a ball bearing construction 31, the other part of which is formed by the first named end of the member 26 in connection with which the balls of the bearing 31 also operate, and this construction serves to retain the member 26 against displacement in one direction in the tubular hub 10.

The sleeve member 29 is threaded into the other end of the tubular hub 10 and is provided with an annular recess 32 in connection with which the ball bearings 28 operate, and this member also forms part of another ball bearing construction 33 having a ball race or sleeve 34 secured to the threaded end 35 of the shaft 11 inwardly of the pedal 13, and this construction serves to prevent the displacement of the member 26 and the other parts in the opposite direction of the hub 10.

The inner face of the sleeve 20 is provided with a plurality of teeth or projections 36 in connection with which a sleeve clutch member 37 is adapted to operate, said clutch member being mounted upon a threaded portion 38 of the shaft 11 and being movable longitudinally thereof by said thread, the bore of the sleeve 37 being provided with threaded grooves 39 to accomplish this result, and the opposite side faces of the clutch member 37 are provided with teeth or projections 40 and 41, the teeth or projections 40 being adapted to operate in connection with the teeth or projections 36 on the sleeve 20.

The clutch member 37 is rotatably mounted in the member 26 and the teeth or projections 41 thereof are adapted to operate in connection with a brake actuating sleeve 42, or teeth or projections 43 on one face thereof to move said member into position to operate a brake band or element 44.

The sleeve member 29, or the inner end thereof, is rectangular in form as shown at 45 in Figs. 3 and 4 of the drawing, and the bore 46 of the brake actuating member 42 is of similar form whereby said member is keyed to the sleeve member 29 but is free to move longitudinally thereof as will be apparent.

The brake band or element 44 is normally held against movement within the rotatable member 26 and is keyed to the brake actuating member 42 by projections 47 on the member 42, which extend into key-ways or recesses 48 in the bore of the brake band or element 44 as clearly shown in Fig. 4 of the drawing. The opposite sides of the band or element 44 are provided with saw-cuts or recesses 49 which divide the opposite end portions of said brake band into separate spring brake members 50, the inner faces of which are beveled to operate in connection with corresponding beveled portions 51 and 52 on the sleeve member 29 and brake actuating member 42 respectively, as clearly shown in Fig. 1 of the drawing. In other words, in the movement of the member 42 toward the pedal 13 by the clutch 37, the brake band or element 44, or the spring brake members 50 thereof, will be expanded radially by the movement thereof upon the bevel or tapered seats 51 and 52, and forced into engagement with the bore of the sleeve member 26 to retard and stop the rotation thereof depending upon the pressure applied.

From the foregoing it will be apparent that the sprocket 21 and the member 26 mounted in connection therewith through the sleeve 20 is free to rotate in the hub 10 on the bearings 28 and 31, and in driving or propelling the vehicle the rotation of the shaft 11 by the pedals 12 and 13 will cause the clutch member 37 to move in the direction of the pedal 12 and into engagement with the sleeve 20 to correspondingly rotate said sleeve as well as the sprocket 21 and member 26, if this rotation or driving power be stopped or, in other words, if the pedals 12 and 13 be held stationary, the sprocket 21 and member 26 will continue to rotate, due to the momentum developed, on the bearings 19 and 33 as well as on the bearings 28 and 31, and if it is desired to retard or stop the progress or rotary movement of the sprocket 21 and member 26, by applying reverse pressure on the pedals 12 and 13, the threads 38 of the shaft 11 will operate to move the clutch 37 into engagement with the brake actuating member 42 to move said member in the direction of the pedal 13 and to expand the members 50 of the brake band or element 44 into contact with the member 26, as will be apparent. By reason of the comparatively long braking surface on the member 26 a gradual braking action may be given to said member, or a very sudden braking action given, if desired.

In the event of a break down in the driving and braking mechanism involving the several parts within the tubular hub 10 I provide means for driving the vehicle, which consists in engaging a predetermined portion of the sprocket 21 as shown at 53 and providing an aperture 54 centrally of said enlargement, and a pin 55 is adjustably mounted in an enlargement 56 on the shank of the pedal 12, and the inner end 57 of said pin is adapted to be moved into the aperture 54 of the sprocket 21 to key the sprocket to said pedal thus permitting of the driving of the vehicle, whenever desired, in the event of a breakdown of the other operative parts as hereinafter set out.

It will also be apparent that with my improved construction the various operative parts may be quickly and easily detached for repair or other purposes, by simply removing the pedal 13 and sleeve member 29, and the clutch 37, the member 42 and band or element 44 may be removed without removing the shaft 11, sprocket 21 or member 26. It will also be understood that while I have shown certain details of construction for carrying my invention into effect and specific forms of bearings and other units, that I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. A drive and brake mechanism mechanism of the class described comprising a shaft, means whereby said shaft may be rotated, a drive member rotatably mounted on said shaft, and means keyed to and movable longitudinally of the shaft and adapted to be coupled with said drive member whereby the rotation of said shaft in one direction will correspondingly rotate said drive member.

2. A drive and brake mechanism of the class described comprising a shaft, means whereby said shaft may be rotated, a drive member rotatably mounted on said shaft, means keyed to and movable longitudinally of the shaft and adapted to be coupled with said drive member whereby the rotation of said shaft in one direction will correspondingly rotate said drive member, and means whereby said drive member may rotate freely on said shaft when held in a stationary position.

3. A drive and brake mechanism of the class described comprising a shaft, means whereby said shaft may be rotated, a drive member rotatably mounted on said shaft, means keyed to and movable longitudinally of the shaft and adapted to be coupled with said drive member whereby the rotation of said shaft in one direction will correspondingly rotate said drive member, and means involving a brake element in operative connection with said first named means whereby the reverse rotation of said shaft will move said brake element into operative position to retard or stop the rotation of said drive member.

4. A drive and brake mechanism of the class described comprising a shaft, means whereby said shaft may be rotated, a drive member rotatably mounted on said shaft, means keyed to and movable longitudinally of the shaft and adapted to be coupled with said drive member whereby the rotation of said shaft in one direction will correspondingly rotate said drive member, means involving a brake element in operative connection with said first named means whereby the reverse rotation of said shaft will move said brake element into operative position to retard or stop the rotation of said drive member, and suitable bearings for said drive member and said shaft.

5. A drive and brake mechanism of the class described comprising a shaft provided with pedals by means of which said shaft may be rotated, a sprocket rotatably mounted on said shaft and provided with a member encircling said shaft, and a clutch keyed to and movable longitudinally of said shaft within said member whereby the rotation of the shaft by said pedals in one direction will cause said member and sprocket to be correspondingly rotated.

6. A drive and brake mechanism of the class described comprising a shaft provided with pedals by means of which said shaft may be rotated, a sprocket rotatably mounted on said shaft and provided with a member encircling said shaft, a clutch keyed to and movable longitudinally of said shaft within said member whereby the rotation of the shaft by said pedals in one direction will cause said member and sprocket to be correspondingly rotated, a brake element mounted on said shaft within said member, and means adapted to be operated by said clutch for moving said brake element into operative position to retard or stop the rotation of said sprocket and member in the reverse rotation of said shaft.

7. A drive and brake mechanism of the class described comprising a shaft provided with pedals by means of which said shaft may be rotated, a sprocket rotatably mounted on said shaft and provided with a member encircling said shaft, a clutch keyed to and movable longitudinally of said shaft within said member whereby the rotation of the shaft by said pedals in one direction will cause said member and sprocket to be correspondingly rotated, a brake element mounted on said shaft within said member, means adapted to be operated by said clutch for moving said brake element into operative position to retard or stop the rotation of said sprocket and member in the reverse rotation of said shaft, and suitable bearings for said sprocket and member.

8. A drive and brake mechanism of the class described comprising a shaft provided with pedals by means of which said shaft may be rotated, a sprocket rotatably mounted on said shaft and provided with a member encircling said shaft, a clutch keyed to and movable longitudinally of said shaft within said member whereby the rotation of the shaft by said pedals in one direction will cause said member and sprocket to be correspondingly rotated, a brake element mounted on said shaft within said member, means adapted to be operated by said clutch for moving said brake element into operative position to retard or stop the rotation of said sprocket and member in the reverse rotation of said shaft, suitable bearings for said sprocket and member and the opposite end portions of said shaft being provided with bearings.

9. A drive and brake mechanism of the class described comprising a shaft provided with pedals by means of which said shaft may be rotated, a sprocket rotatably mounted on said shaft and provided with a member encircling said shaft, a clutch keyed to and movable longitudinally of said shaft within said member whereby the rotation of the shaft by said pedals in one direction will cause said member and sprocket to be correspondingly rotated, a brake element mounted on said shaft within said member, means adapted to be operated by said clutch for moving said brake element into operative position to retard or stop the rotation of said sprocket and member in the reverse rotation of said shaft, suitable bearing for said sprocket and member, and the opposite end portions of said shaft being provided with bearings, one of said pedals being detachably mounted in connection with said shaft.

10. A drive and brake mechanism of the class described comprising a shaft provided with pedals by means of which said shaft may be rotated, a sprocket rotatably mounted on said shaft and provided with a member encircling said shaft, a clutch keyed to and movable longitudinally of said shaft within said member whereby the rotation of the shaft by said pedals in one direction will cause said member and sprocket to be correspondingly rotated, a brake element mounted on said shaft within said member, means adapted to be operated by said clutch for moving said brake element into operative position to retard or stop the rotation of said sprocket and member in the reverse rotation of said shaft, suitable bearings for said sprocket and member the opposite end portions of said shaft being provided with bearings, one of said pedals being detachably mounted in connection with said shaft, and means for keying one of the pedals directly to said sprocket.

11. A drive and brake mechanism of the class described comprising a pedal shaft, one of said pedals being detachably mounted in connection with said shaft, a sprocket rotatably mounted on said shaft and provided with a member encircling the shaft, said member being composed of separate parts having suitable bearing faces, a stationary sleeve encircling said shaft and provided with a beveled bearing face, and a floating brake band mounted between said sleeve and that part of the sprocket encircling said shaft and adapted to cooperate with the beveled bearing face of said sleeve.

12. A drive and brake mechanism of the class described comprising a pedal shaft, one of said pedals being detachably mounted in connection with said shaft, a sprocket rotatably mounted on said shaft and provided with a member encircling the shaft, said member being composed of separate parts having suitable bearing faces, a stationary sleeve encircling said shaft and provided with a beveled bearing face, a floating brake band mounted between said sleeve and that part of the sprocket encircling said shaft and adapted to cooperate with the beveled bearing face of said sleeve, and means for controlling the movement of said brake band comprising a collar in threaded engagement with said pedal shaft and capable of longitudinal movement thereon.

13. A drive and brake mechanism of the class described comprising a pedal shaft, one of said pedals being detachably mounted in connection with said shaft, a sprocket rotatably mounted on said shaft and provided with a member encircling the shaft, said member being composed of separate parts having suitable bearing faces, a stationary sleeve encircling said shaft and provided with a beveled bearing face, a floating brake band mounted between said sleeve and that part of the sprocket encircling said shaft and adapted to cooperate with the beveled bearing face of said sleeve, means for controlling the movement of said brake band comprising a collar in threaded engagement with said pedal shaft and capable of longitudinal movement thereon, and a sleeve in operative connection with said collar and cooperating with said band, said sleeve and collar having tooth engagement one with the other.

14. A drive and brake mechanism of the class described comprising a pedal shaft, one of said pedals being detachably mounted in connection with said shaft, a sprocket rotatably mounted on said shaft and provided with a member encircling the shaft, said member being composed of separate parts having suitable bearing faces, a stationary sleeve encircling said shaft and provided with a beveled bearing face, a floating brake band mounted between said sleeve and that part of the sprocket encircling said shaft and adapted to cooperate with beveled bearing face of said sleeve, means for controlling the movement of said brake band comprising a collar in threaded engagement with said pedal shaft and capable of longitudinal movement thereon, a sleeve in operative connection with said collar and cooperating with said band, said sleeve and collar having tooth engagement one with the other, and means adjustably mounted upon one of said pedals adapted to cooperate with said sprocket for coupling said parts together.

15. A drive and brake mechanism of the class described comprising a pedal shaft, one of said pedals being detachably mounted in connection with said shaft, a sprocket rotatably mounted on said shaft and provided with a member encircling the shaft, said member being composed of separate parts having suitable bearing faces, a stationary sleeve encircling said shaft and provided with a beveled bearing face, a floating brake band mounted between said sleeve and that part of the sprocket encircling said shaft and adapted to cooperate with the beveled bearing face of said sleeve, means for controlling the movement of said brake band comprising a collar in threaded engagement with said pedal shaft and capable of longitudinal movement thereon, a sleeve in operative connection with said collar and cooperating with said band, said sleeve and collar having tooth engagement one with the other, and said collar having tooth engagement with a part of said sprocket encircling the pedal shaft.

In testimony that I claim the foregoing as my invention I have signed my name this 24th day of June, 1922.

JOSEPH BAISI.